United States Patent Office 2,899,111
Patented Aug. 11, 1959

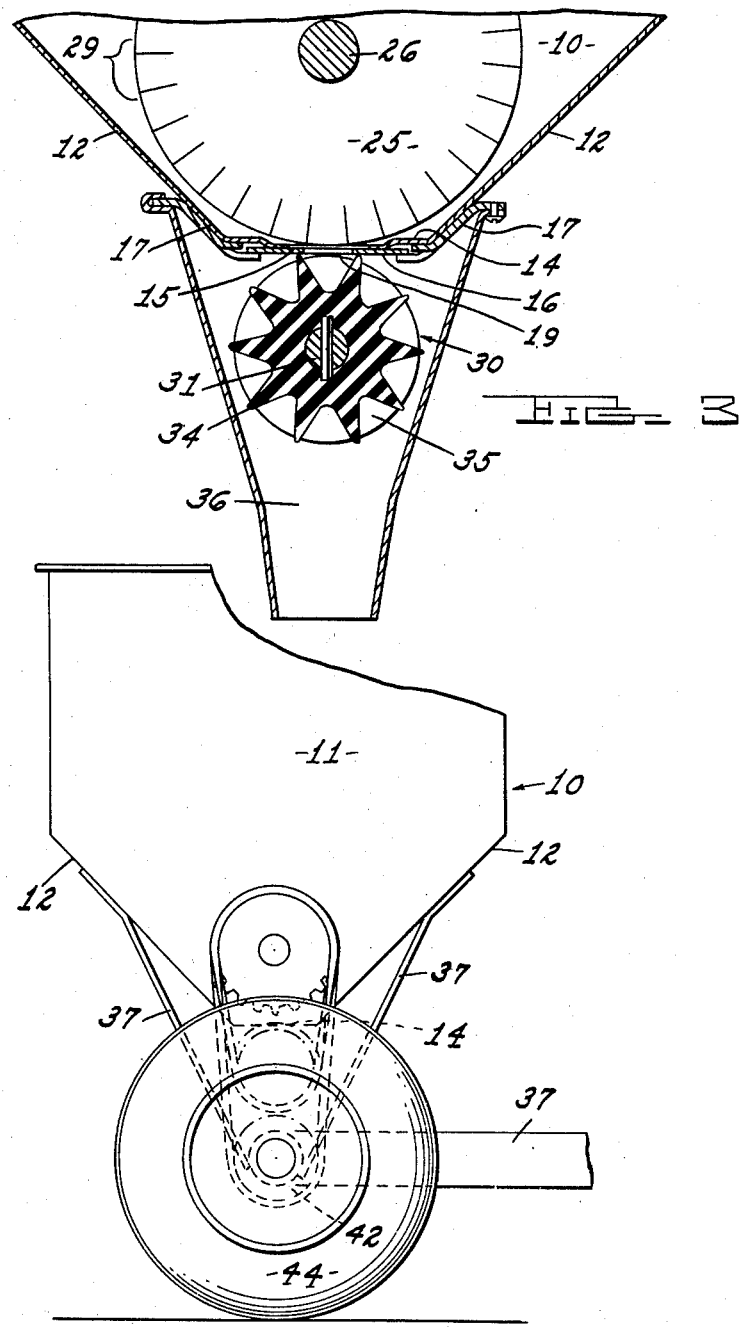

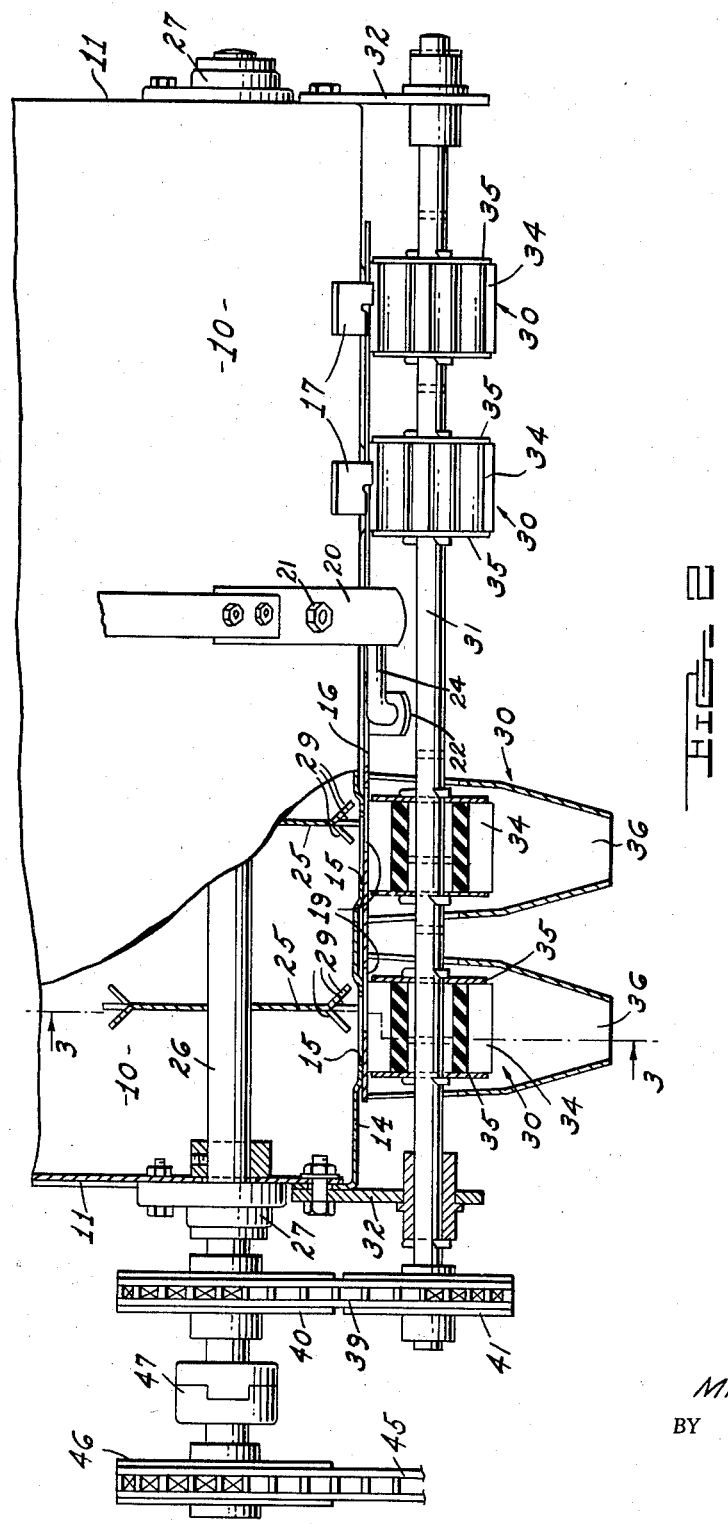

2,899,111

FERTILIZER SPREADER

Max C. Christensen, Royal Oak, Mich., assignor to Ford Motor Company, Dearborn, Mich., a corporation of Delaware Application October 17, 1956, Serial No. 616,424

6 Claims. (Cl. 222—238)

This invention relates to fertilizer spreaders (including fertilizer attachments for use with planters and grain drills) for the spreading or drilling of dry granular fertilizer.

Fertilizer spreaders for the spreading of dry granular fertilizer (including lime and other granular soil additives) usually consist of a hopper mounted for transport. One or more adjustable apertures are provided at the bottom of the hopper to control the volume of feed, the apertures being closed when spreading is not desired. Often a rotary agitator is provided adjacent the apertures to prevent the granular material from packing and to promote uniform flow through the apertures, even though the material be somewhat lumpy or have a tendency to pack.

Fertilizer spreaders of the above type often are mounted on farm tractors to fertilize in conjunction with the planting or cultivating of crops. Tractor mounted cultivators frequently are provided with a lifting mechanism for raising the cultivator elements from contacting the ground, and the fertilizer spreaders are often connected with the cultivator lift mechanism so as to close the apertures at the bottom of the fertilizer hoppers whenever the cultivator elements are raised. This is often accomplished by closing the adjustable orifice, either by moving the adjustable shutter or by closing the orifice with an auxiliary flap or cover which does not disturb the adjustment of the size of the orifice.

Fertilizer spreaders of this type also are often mounted on their own chassis or on the chassis of a seeding machine such as a grain drill. To close the apertures on a fertilizer hopper mounted on its own chassis it is often necessary to move a lever linked to the adjustable shutter. Pull-behind seeding machines frequently are provided with a lifting mechanism for raising the ground-engaging elements from the ground, and fertilizer spreaders are often connected with the lift mechanism so as to close the apertures at the bottom of the fertilizer hoppers whenever the ground-engaging elements are raised.

In the present invention, which is particularly adapted for use with tractor mounted cultivators or on seeding machines, the hoppers are provided with adjustable orifices for feeding the granular fertilizer by gravity. A rotary driven agitator is provided for each orifice, the agitator preferably actually projecting into the orifice itself. A rotary, peripherally pocketed cutoff wheel is provided immediately below the orifice and preferably is driven by the drive mechanism of the agitator. The cutoff wheel, which makes substantially a wiping contact with the underside of the orifice, does not serve a metering function, the pockets being sufficiently large that in normal operation they will not be filled, even when the orifice is adjusted for maximum volume of discharge. Instead, the cutoff wheel serves to limit discharge from the hopper at very slow speeds and when standing still, the peripheral pocket or pockets of the cutoff wheel against the orifice filling and preventing further flow of fertilizer from the hopper. Accordingly, in the spreader of the present invention, it is not necessary to close the adjustable orifices or to disturb the adjustment of the shutter, the stopping of the rotary drive from the agitator also stopping the drive of the cutoff wheel and thereby stopping flow of fertilizer from the hopper. In the usual spreaders operated by a ground driven wheel, stopping of forward motion of the tractor stops the wheel and thereby prevents further flow from the fertilizer hopper without the necessity of raising the cultivator elements or other ground engaging elements as in certain common constructions.

Among the objects of the present invention are to provide a simplified and dependable spreader for fertilizer of the granular type which is uniform in its spreading action, does not require that the hopper feed orifices be closed when forward movement of the hopper is stopped and which, when mounted on a tractor mounted cultivator or seeding machine, does not require lifting of the cultivator or ground engaging elements of the seeding machine to prevent flow of fertilizer from the hopper.

Other objects and objects relating to details of construction and manufacture will become more apparent from a study of the detailed description to follow.

My invention is clearly defined in the appended claims. In the claims, as well as in the description, parts may at time be identified by specific names for clarity and convenience, but such nomenclature is to be understood as having the broadest meaning consistent with the context and with the concept of my invention as distinguished from the pertinent prior art. The best form in which I have contemplated applying my invention is illustrated in the accompanying drawings forming part of this specification in which:

Figure 1 is a somewhat diagrammatic side elevation of a fertilizer spreader according to the present invention, a portion of the spreader being broken away for convenience of illustration.

Figure 2 is a front elevation of the fertilizer receiving and distributing portion of the spreader, parts of the hopper and distributor being shown in vertical section, and the top portion of the hopper being broken away.

Figure 3 is a transverse vertical section through the hopper and distributor taken generally along the line 3—3 of Figure 2.

Referring to Figure 1, the fertilizer spreader of the present invention includes a fertilizer hopper 10 which preferably is provided with vertical end walls 11—11 and side walls 12—12, the upper portions of which are vertical and the lower portions of which converge and are connected by a more or less flat bottom wall 14. The bottom wall 14 is provided at spaced intervals along its length with fertilizer distributor openings 15 which may be triangular in shape, if desired. An adjustable shutter 16 is provided which is slidably mounted against the bottom wall 14 of the hopper 10, the shutter being held against the hopper by lugs 17 secured to the hopper and projecting about the lateral edges of the shutter. The shutter is provided with a series of openings 19 having a spacing coinciding with the openings 15 in the bottom of the hopper, the openings 19 preferably being rectangular and more or less registering with the openings 15 of the hopper.

A lever 20 mounted on a pivot bolt 21 secured to a hopper side wall 12 is connected to a projecting lug 22 on the shutter by a link 24, oscillation of the lever 20 serving to move the shutter longitudinally of the hopper to control the degree of registration of the openings 19 of the shutter with the openings 15 of the hopper and thus control the rate at which granular fertilizer received within the hopper is distributed. The construction is such that, at any position of the shutter, the openings 19 therein all register in equal degree with the openings 15 of the hopper so as to provide a uniform effective size of apertures across the entire bottom wall of the hopper. If desired, the margins of the openings 15 in the hopper may be embossed or displaced downwardly towards the shutter to reduce the area of contact between the bottom wall of the hopper and the shutter, and to provide for ease of operation of the shutter.

An agitator 25 is provided for agitating the granular fertilizer material adjacent each opening 15 in the hopper. The agitators 25 are secured to a shaft 26 mounted for rotation in bearings 27—27 on the end walls 11—11 of the hopper, the shaft projecting across the interior of the hopper parallel to and directly above the bottom wall 14.

Each agitator 25 preferably comprises a circular metal disc coaxially secured to the shaft 26, and having a series of peripheral teeth or elements 29 which pass across the inner side (inside the hopper) of the opening. If desired, the path of the outer ends of at least certain of the peripheral teeth 29 may extend into the actual opening 15 in the bottom wall of the hopper, and other of the elements 29 may be laterally deflected as indicated in the drawings to agitate the granular material over a greater area.

A series of rotary valve wheels 30 are secured to a shaft 31 journaled in downward extensions 32—32 of the hopper end walls 11—11, one valve wheel being located directly below each opening 15 in the hopper bottom wall 14. Each rotary valve 30 comprises a wheel-like element having a plurality of radially outwardly opening peripheral chambers separated by relatively narrow transverse walls, the outer ends of which make substantially a wiping contact with the margins of the openings 19 on the underside of the shutter 16 and thus essentially sweep against the underside of the effective opening in the bottom of the hopper 10.

Preferably, the rotary valves 30 each comprise a star wheel 34 formed of yieldable rubber-like material and of a length slightly greater than the dimension of the openings 15 longitudinally of the hopper. A metal disc 35 is positioned against each end of the star wheel 34 to close the ends of the chambers in the star wheel. Preferably, the elements of the star wheel forming the transverse walls between the chambers projects slightly beyond the periphery of the discs 35—35 and make actual wiping contact against the margin of each opening 19 on the underside of the shutter 16. The spacing between adjacent transverse walls or points of the star wheel 34 preferably is approximately equal to the dimension of the openings 19 in the shutter measured transversely of the hopper. It has been found that even though the rotary valves 30 should stop with portions of two of the peripheral chambers opposite the openings 19 on the underside of the shutter 16 and the transverse walls of those chambers remote from the openings not making sealing contact with the underside of the shutter 16, the angle of repose or frictional resistance to flow of the granular material will not permit it to overflow the two chambers and, therefore, flow of fertilizer from the hopper 10 will be interrupted.

Each rotary valve 34 is received within a chute 36 which may be mounted on the upper portions of the lugs 22 which secure the shutter 16 in position. The chutes 36 are funnel-like elements of sheet metal which do not confine the rotary valves 30, there being ample space between the walls of the chute and the rotary valve to permit fertilizer to fall freely therebetween. The chute 36 serves merely to more or less confine the granular fertilizer and direct it vertically downwardly, even in a wind.

The hopper 10 may be carried on a framework generally indicated as 37 for supporting the hopper. The framework 37 may be mounted on a tractor or may be trailed and supported on its own wheels, as desired.

The shafts 26 and 31 are connected for simultaneous rotation by a drive chain 39 received about sprockets 40 and 41 affixed to the shafts 26 and 31, respectively. The shafts 26 and 31 may be driven by a sprocket 42 rotated by a ground-engaging wheel 44 which may also support the framework 37 mounting the hopper.

Preferably, the drive for shafts 26 and 31 comprises a drive chain 45 engaged with the sprocket 42 and with a second sprocket 46 located on an extension of the shaft 26. A clutch 47, functionally interposed between the sprockets 46 and the shaft 26, provides means for stopping drive of the shafts 26 and 31 and stopping spreading of fertilizer, even though the ground-engaging wheel 44 is still rotating.

The above described spreader has been found to positively control the spreading of fertilizer. When the drive to the agitator shaft 26 and valve wheel shaft 31 is interrupted, spreading immediately stops even though the hopper 10 is more or less shaken or jarred as the tractor or spreader proceeds over a field. Moreover, with a single control of the drive of the agitator and valve wheel shafts, which may be by means of the clutch 47 or by raising the ground-driven wheel 44, the flow of fertilizer is positively cut off without disturbing the adjustment of the shutter 16 which determines the effective size of openings in the bottom of the hopper and without the necessity of closing the openings by an auxiliary shutter.

A further advantage of the spreader of the present invention is that the spreading of fertilizer is more accurately controlled. Inasmuch as there is agitation of the granular material at the inside of the hopper openings and wiping across the outside of the hopper openings, any tendency of the material to bridge or pack and resist flowing is resisted and there is a more nearly uniform spreading action in addition to the positive cutoff above described.

I claim:

1. In a fertilizer spreader; a hopper adapted to receive granular material and having a bottom wall with an adjustable opening therein; a rotatably mounted, generally circular agitator having a plurality of generally radially outwardly extending peripheral teeth, the agitator being positioned so that, upon rotation thereof, the ends of the teeth move along a circular path across the inner side of the opening; a wheel mounted on an axis generally parallel to the bottom wall of the hopper and having a plurality of radially outwardly opening peripheral chambers separated by relatively narrow transverse walls, the wheel being mounted directly below the opening, the width of the wheel being greater than the width of the opening, the periphery of the wheel making substantially a wiping contact with the underside of the opening and the free passage of granular material about the periphery of the wheel being otherwise unobstructed, and the diameter of the wheel being several times the length of the opening to prevent leakage of granular material through the opening and about the periphery of the wheel when the wheel is at rest; and common means for rotating the agitator and the wheel.

2. In a fertilizer spreader, a hopper adapted to receive granular material and having a bottom wall with an adjustable opening therein; a rotatably mounted agitator having radially projecting elements, the agitator being positioned so that, upon rotation thereof, the elements move along a circular path across the inner side of the opening; a wheel mounted on an axis generally parallel to the bottom wall of the hopper and having a plurality of radially outwardly opening peripheral chambers separated by relatively narrow transverse walls, the wheel being mounted directly below the opening, the width of the wheel being greater than the width of the opening, the periphery of the wheel making substantially a wiping contact with the underside of the opening and the free passage of granular material about the periphery of the wheel being otherwise unobstructed, and the diameter of the wheel being several times the length of the opening to prevent leakage of granular material through the opening and about the periphery of the wheel when the wheel is at rest; and common means for rotating the agitator and the wheel.

3. In a fertilizer spreader, a hopper adapted to receive granular material and having a bottom wall with an adjustable opening therein; a rotatably mounted agitator having radially projecting elements, the agitator being positioned so that, upon rotation thereof, the elements move along a circular path across the inner side of the opening; a wheel mounted on an axis generally parallel to the bottom wall of the hopper and having a body provided with a plurality of radially outwardly opening peripheral chambers separated by somewhat flexible, relatively narrow transverse walls, the wheel being mounted directly below the opening, the width of the wheel being greater than the width of the opening, the periphery of the wheel making substantially a wiping contact with the underside of the opening and the free passage of granular material about the periphery of the wheel being otherwise unobstructed, and the diameter of the wheel being several times the length of the opening to prevent leakage of granular material through the opening and about the periphery of the wheel when the wheel is at rest; and common means for rotating the agitator and the wheel.

4. In a fertilizer spreader, a hopper adapted to receive granular material and having a bottom wall with a series of openings therein, the size of which are adjustable; a shaft journaled in the sides of the hopper and extending parallel to the bottom wall thereof; a series of agitators mounted on the shaft, one adjacent each opening, and having elements moving across the inner sides of the openings upon rotation of the shaft; a second shaft parallel to the first shaft and extending below the openings in the hopper; a series of valve wheels affixed to the second shaft at intervals, one valve wheel directly below each opening, the valve wheels being greater in width than the width of the openings and having peripheral chambers separated by relatively narrow transverse walls, the walls making substantially wiping contact with the underside of the openings and the free passage of granular material about the periphery of the wheels being otherwise unobstructed, and the diameter of the wheels being several times the length of the openings to prevent leakage of granular material through the openings and about the periphery of the wheels when the wheels are at rest; means linking the shafts for simultaneous rotation; means for driving the shafts; and means for interrupting the drive of the shafts.

5. In a fertilizer spreader, a hopper adapted to receive granular material and having a bottom wall with a series of openings therein; a shaft journaled in the sides of the hopper and extending parallel to the bottom wall thereof; a series of agitators mounted on the shaft, one adjacent each opening, and having elements moving across the inner sides of the openings upon rotation of the shaft; a second shaft parallel to the first shaft and extending below the openings in the hopper; a series of valve wheels affixed to the second shaft at intervals, one valve wheel directly below each opening, the valve wheels being greater in width than the width of the openings and having peripheral chambers separated by relatively narrow transverse walls, the walls making substantially wiping contact with the underside of the openings and the free passage of granular material about the periphery of the wheels being otherwise unobstructed, and the diameter of the wheels being several times the length of the openings to prevent leakage of granular material through the openings and about the periphery of the wheels when the wheels are at rest; means linking the shafts for simultaneous rotation; means for driving the shafts; and means for interrupting the drive of the shafts.

6. In a fertilizer spreader, a hopper adapted to receive granular material and having a bottom wall with a series of openings therein; a shaft journaled in the sides of the hopper and extending parallel to the bottom wall thereof; a series of agitators mounted on the shaft, one adjacent each opening, and having elements moving across the inner sides of the opening upon rotation of the shaft; a second shaft parallel to the first shaft and extending below the openings in the hopper; a series of valve wheels affixed to the second shaft at intervals, one valve wheel directly below each opening, the valve wheels each comprising a star wheel formed of resilient rubber-like material, the width of the star wheels being greater than the width of the openings and the ends of the peripheral chambers in the star wheel being closed by discs, the walls between the peripheral chambers making substantially wiping contact with the underside of the openings and the free passage of granular material about the periphery of the wheels being otherwise unobstructed, and the diameter of the wheels being several times the length of the openings to prevent leakage of granular material through the openings and about the periphery of the wheels when the wheels are at rest; means linking the shafts for simultaneous rotation; means for driving the shafts; and means for interrupting the drive of at least the second shaft.

References Cited in the file of this patent

UNITED STATES PATENTS

| | | |
|---|---|---|
| 984,254 | Akeley | Feb. 14, 1911 |
| 2,593,516 | Alley et al. | Apr. 22, 1952 |
| 2,738,901 | Swenson | Mar. 20, 1956 |
| 2,748,989 | Russel | June 5, 1956 |